(12) United States Patent
Yu et al.

(10) Patent No.: US 10,505,172 B2
(45) Date of Patent: Dec. 10, 2019

(54) CURRENT COLLECTING BOARD AND BATTERY MODULE

(71) Applicant: Shenzhen Anding New Energy Technology Development Co., Ltd., Shenzhen, Guangdong (CN)

(72) Inventors: Xiaoming Yu, Guangdong (CN); Shirong Wu, Guangdong (CN); Hao Xu, Guangdong (CN); Haizhou Yan, Guangdong (CN); Zhijian Cai, Guangdong (CN)

(73) Assignee: Shenzhen Anding New Energy Technology Development Co., Ltd., Shenzhen (CN)

( * ) Notice: Subject to any disclaimer, the term of this patent is extended or adjusted under 35 U.S.C. 154(b) by 36 days.

(21) Appl. No.: 15/922,885

(22) Filed: Mar. 15, 2018

(65) Prior Publication Data

US 2018/0287123 A1 Oct. 4, 2018

(30) Foreign Application Priority Data

Mar. 30, 2017 (CN) .......................... 2017 1 0201386

(51) Int. Cl.
*H01M 2/20* (2006.01)
*H01M 2/10* (2006.01)
*H01M 2/34* (2006.01)
*H01M 10/052* (2010.01)

(52) U.S. Cl.
CPC ............. *H01M 2/206* (2013.01); *H01M 2/10* (2013.01); *H01M 2/1077* (2013.01); *H01M 2/20* (2013.01); *H01M 2/348* (2013.01); *H01M 10/052* (2013.01); *H01M 2220/20* (2013.01)

(58) Field of Classification Search
CPC .... H01M 2/206; H01M 2/1077; H01M 2/348; H01M 10/052; H01M 2/20; H01M 2/10
See application file for complete search history.

(56) References Cited

U.S. PATENT DOCUMENTS

| 6,935,020 B2* | 8/2005 | Ikeda | H01M 2/1077 29/825 |
| 2015/0325824 A1* | 11/2015 | Hasegawa | H01M 2/1016 429/53 |
| 2016/0049626 A1* | 2/2016 | Yasui | H01M 2/1016 429/54 |
| 2016/0141573 A1* | 5/2016 | Aoki | H01M 2/1016 429/53 |
| 2016/0336556 A1* | 11/2016 | Okutani | H01M 2/105 |

\* cited by examiner

*Primary Examiner* — Stewart A Fraser

(57) ABSTRACT

A current collecting board includes a base board, a conductive board mounted on the base board, a number of conductive plates, and a number of security elements. The base board includes a first surface, a second surface, and a number of receiving protrusions extending upwardly from the first surface. The base board defines a number of first through holes, each receiving protrusion surrounds a first through hole. Each conductive plate defines a second through hole. The receiving protrusion includes a number of leading blocks and a number of clamping blocks; each conductive plate is received in a receiving protrusion and clamped between the leading blocks and the clamping blocks. One end of each security element is solder to and electrically connected to a conductive plate, the other end of each security element is soldered to the conductive board. A battery module using the current collecting board is also provided.

15 Claims, 9 Drawing Sheets

US 10,505,172 B2

CURRENT COLLECTING BOARD AND BATTERY MODULE

CROSS-REFERENCE TO RELATED APPLICATION

The present patent application claims priority to Chinese patent application number 201710201386.6 filed on Mar. 30, 2017, the whole disclosure of which is incorporated herein by reference.

BACKGROUND OF THE INVENTION

Field of the Invention

This invention relates to power batteries, and more particular, to a current collecting board and a battery module using same.

Description of the Related Art

Lithium iron phosphate batteries have being rapidly developed in recent years. The lithium iron phosphate batteries are widely employed as powers for vehicles such as cars and buses.

In order to provide a desirable output voltage and output current, a power battery pack employed in a vehicle usually includes a number of single lithium iron phosphate batteries. Generally, a traditional power battery pack includes a number of battery modules connected in series. Each battery module includes several single batteries which are fixed between a pair of dielectric housings each equipped with a circuit board, and the several single batteries are connected in parallel through two circuit boards positioned at two sides of the several single batteries. The circuit board includes a base substrate, a number of contact plates, and a number of security portions. The base substrate, the contact plates, and the security portions are usually made of copper and integrally formed. Each contact portion having a width greater than a respective security portion and is electrically connected to the base substrate by the respective security portion. One end of the single battery is electrically connected to a contact portion. However, it is decreases energy density for using the dielectric housings. Furthermore, when one single battery is short circuit, it is difficult for the security portion to fuse because it is integrally formed with the base substrate and the contact portion.

It is desirable to provide an invention, which can overcome the problems and limitations mentioned above.

SUMMARY OF THE INVENTION

The present invention is directed to a battery module that substantially obviates one or more of the problems due to limitations and disadvantages of the related art.

In an aspect of the present invention, there is provided a current collecting board includes a base board, a conductive board mounted on the base board, a number of conductive plates, and a number of security elements. The base board includes a first surface, a second surface, and a number of receiving protrusions extending upwardly from the first surface. The base board defines a number of first through holes, each receiving protrusion surrounds a first through hole. Each conductive plate defines a second through hole. The receiving protrusion includes a number of leading blocks and a number of clamping blocks; each conductive plate is received in a receiving protrusion and clamped between the leading blocks and the clamping blocks. One end of each security element is solder to and electrically connected to a conductive plate, the other end of each security element is soldered to the conductive board.

In an aspect of the present invention, a battery module using the current collecting board is also provided.

It is to be understood that both the foregoing general description and the following detailed description are exemplary and explanatory and are intended to provide further explanations of the invention as claimed.

DETAILED DESCRIPTION OF THE PREFERRED EMBODIMENTS

Figure 1:
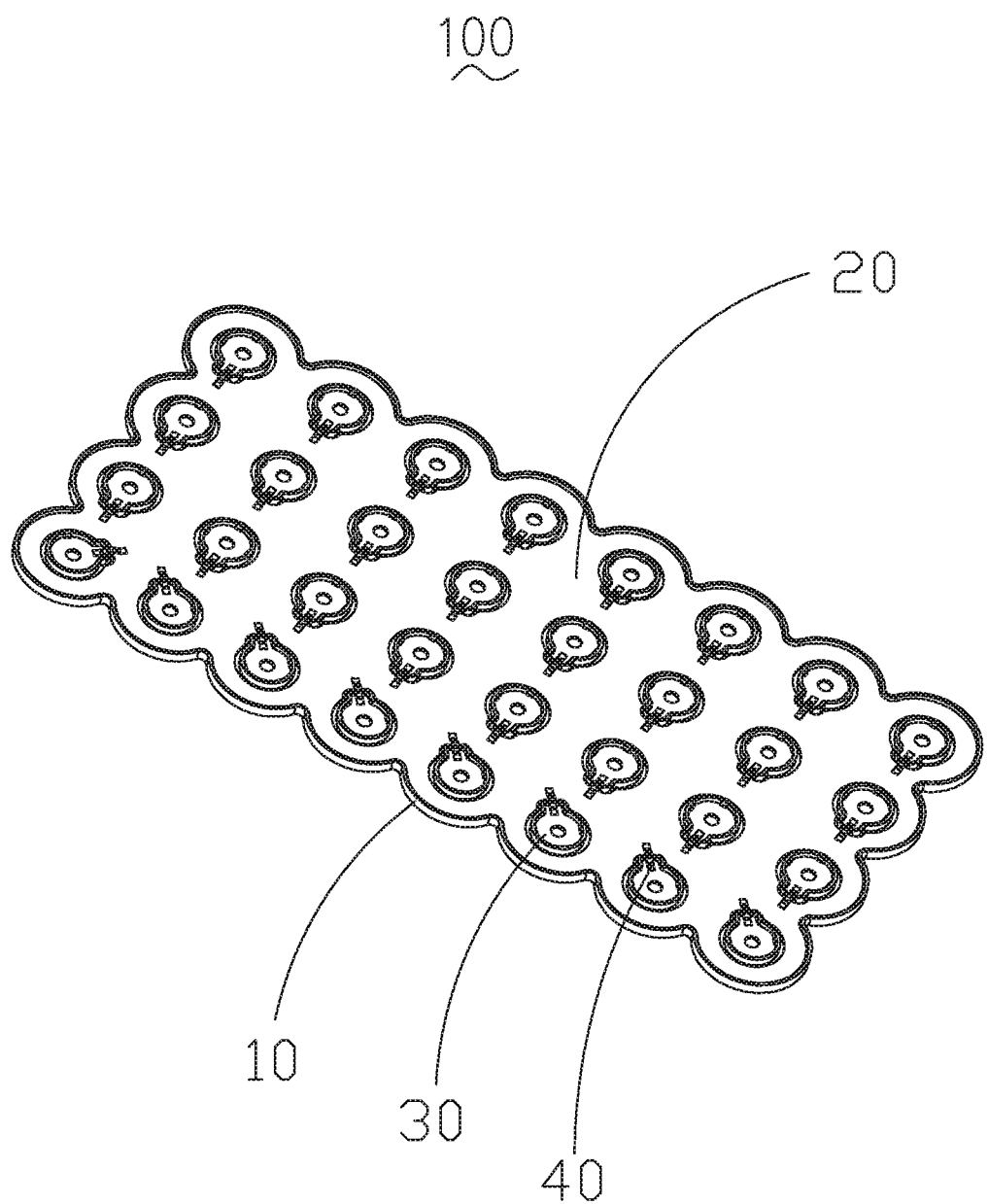
FIG. 1 is an isometric view of a current collecting board, according to a first embodiment.
Figure 2:
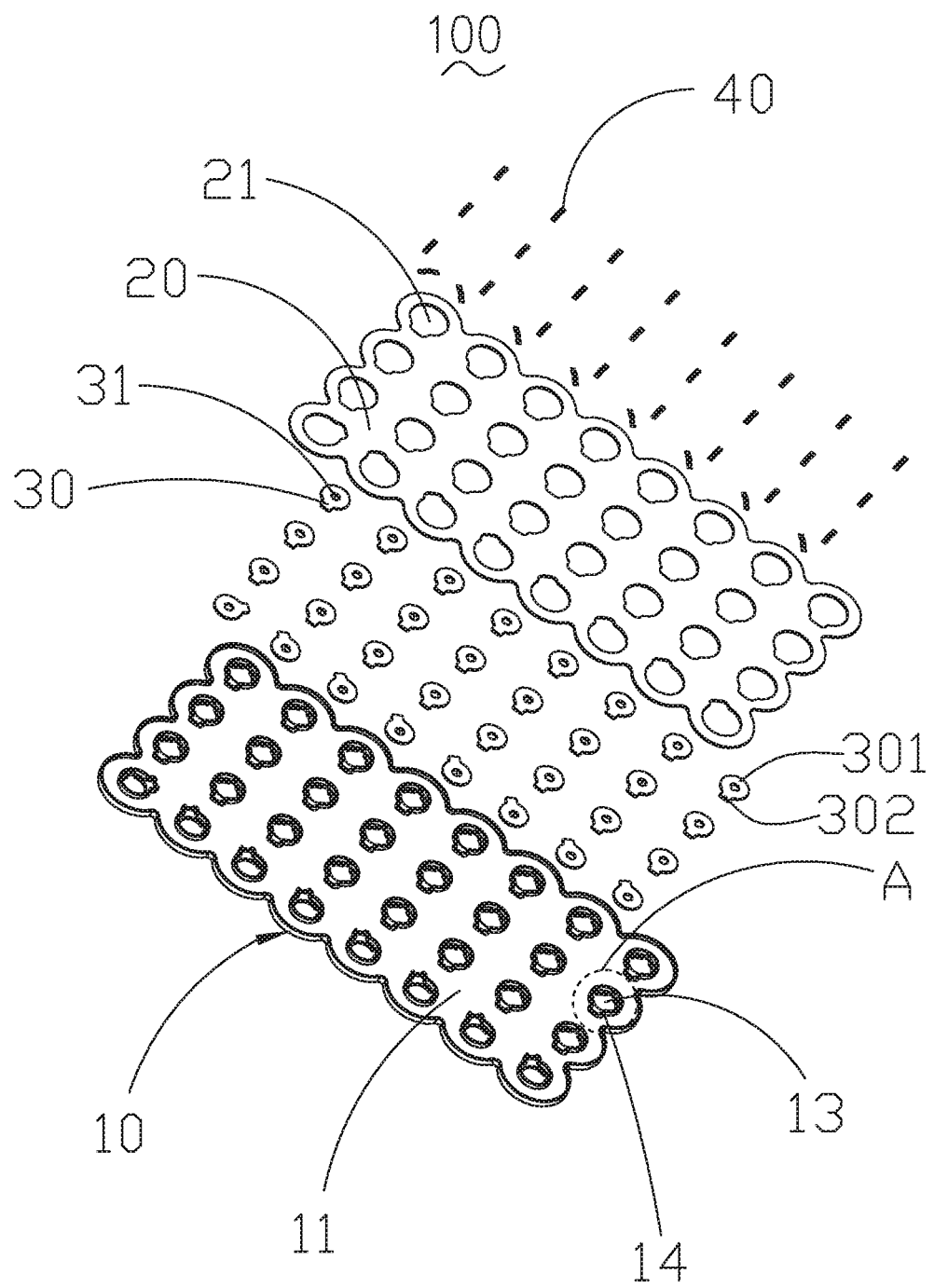
FIG. 2 is an isometric, explode schematic view of the current collecting board of FIG. 1.
Figure 3:
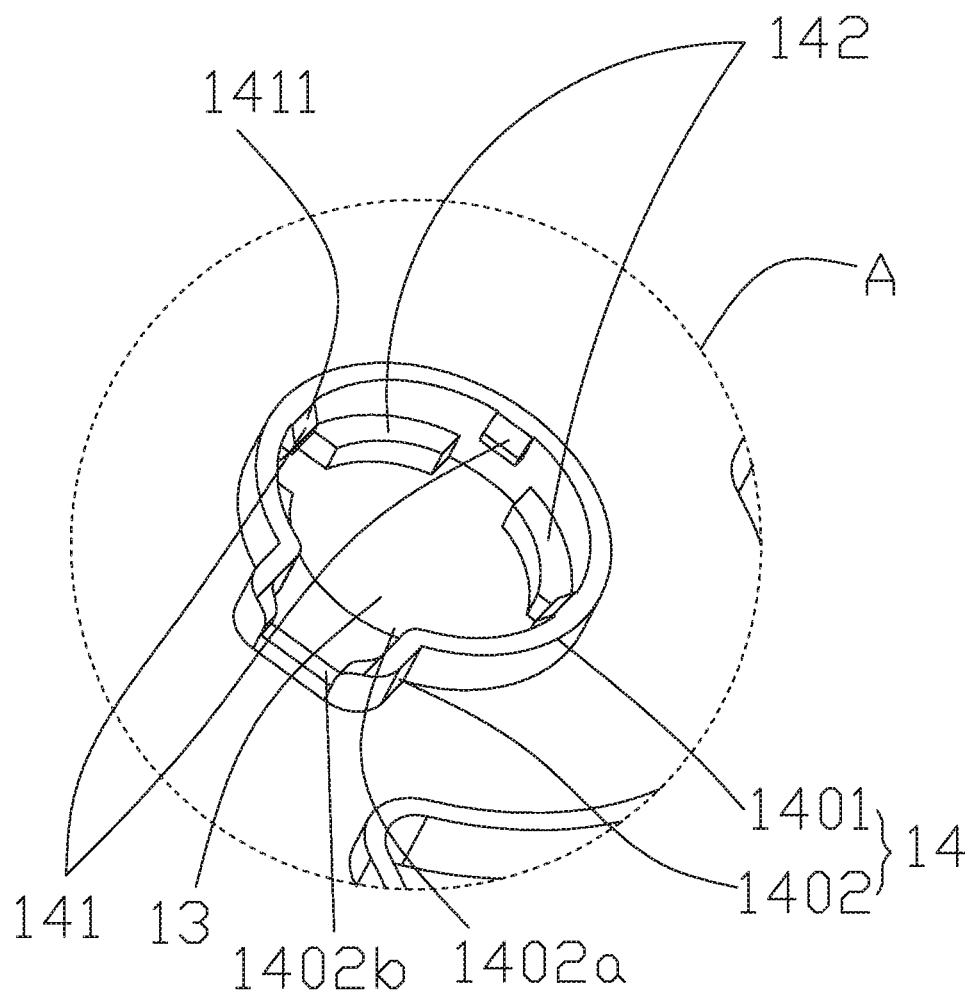
FIG. 3 partial enlarging schematic of circle A of FIG. 2.
Figure 4:
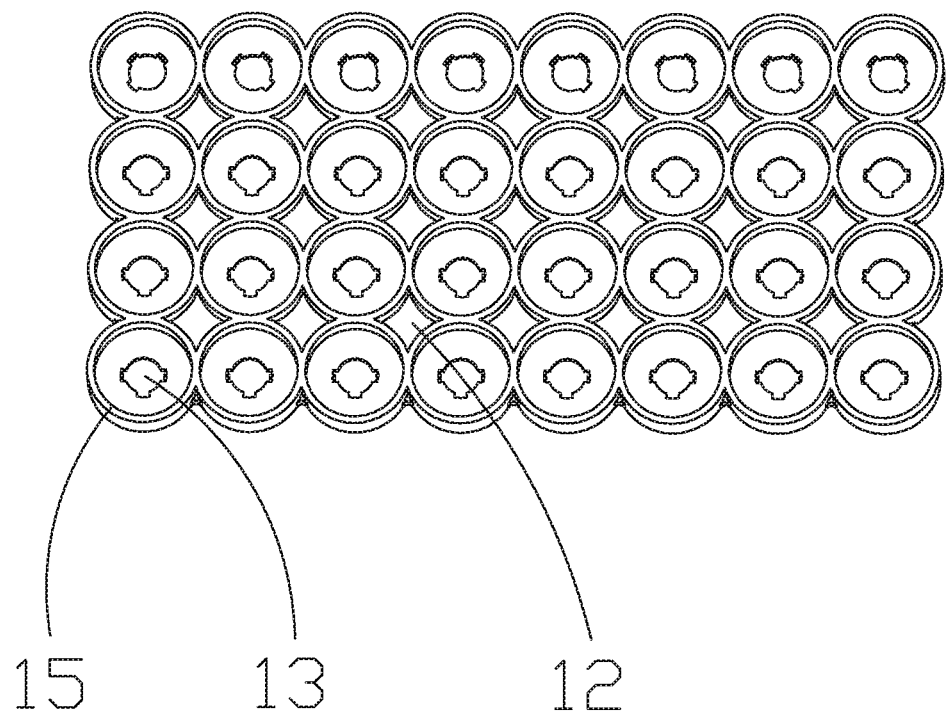
FIG. 4 is similar to FIG. 1 but view from another angle.

Referring to FIG. 1 and FIG. 2, a current collecting board 100, according to a first embodiment, includes a base board 10, a conductive board 20 mounted on the base board 10, a number of conductive plates 30 mounted in the base board 10, and a number of security element 40 each electrically connected a conductive plate 30 to the conductive board 20.

Referring to FIG. 1 to FIG. 4, the base board 10 is made of dielectric material such as plastic by injection molding. The base board 10 is generally in a rectangular shape and includes a first surface 11 and a second surface 12 opposite to the first surface 11. The base board 10 defines a number of first through holes 13 passing through the first surface 11 and the second surface 12. The base board 10 further includes a number of receiving protrusions 14 extending upwardly from the first surface 11. Each receiving protrusion 14 responds to a first through hole 13 and includes a first receiving part 1401 and a second receiving part 1402 connecting to one side of the first receiving part 1401. The first receiving part 1401 is in a hollow cylinder shape and surrounds a respective first through hole 13. The second receiving part 1402 is generally rectangular and defines a first opening 1402a communicating with the first receiving part 1041 and a second opening 1402b opposite to the first opening 1402a. The second opening 1402b is away from the first receiving part 1401. Each receiving protrusion 14 includes a number of leading blocks 141 and clamping blocks 142 extending from an inner surface of the first receiving part 1401 toward a center of the first through hole 13. In the embodiment, the number of the leading blocks 141 is at least three and the number of the clamping blocks 142 is also at least three. The leading blocks 141 are uniformly distributed in a circle. The clamping blocks 142 are uniformly distributed in a circle and nearer to the first surface 11 relate to the leading blocks 141. The leading block 141 includes a leading surface 1411 slanted to the first surface 11. The clamping block 142 is in an arch shape.

The base board 10 further includes a number of receiving barrels 15 extending upwardly from the second surface 12. Each receiving barrel 15 is hollow cylindrical and surrounds a respective first through hole 13. An inner diameter of the receiving barrel 15 is greater than an inner diameter of a first receiving part 1401 and each receiving barrel 15 is coaxial with a respective first through hole 13 and a respective first receiving part 1401.

The conductive board 20 is made of metal and defines a number of positing holes 21. The number of the positing holes 21 is the same as the number of the receiving protrusions 14. Each positing hole 21 is in a shape substantially the same as a respective receiving protrusion 14. The conductive board 20 is made of copper or nickel.

Each conductive plate 30 responds to a receiving protrusion 14. The conductive plate 30 is made of metal such as copper or nickel and includes a first contact portion 301 and a second contact portion 302 connecting to a side of the first contact portion 301. The first contact portion 301 is circular and a diameter of the first contact portion 301 responds to the inner diameter of the first receiving part 1041. The second contact portion 302 is generally rectangular and has a width less than a width of the first contact portion 301. The first contact portion 301 defines a second through hole 31.

Each security element 40 responds to a conductive plate 30. Each security element 40 is made of metal and in a strip shape. In the embodiment, the security element 40 is made of aluminum. The melting point of the security element 40 is lower than the melting point of the conductive plate 30 and lower than the melting point of the conductive board 20.

When assembling the current collecting board 100, each conductive plate 30 pressed into a respective receiving protrusion 14, the first contact portion 301 is attached on the leading surface 1411 of the leading block 141 and led in to the first receiving part 1401. Each conductive plate 30 is received in a respective receiving protrusion 14. The first contact portion 301 is clamped between the leading blocks 141 and the clamping blocks 142 and covers a respective first through hole 13. The second contact portion 302 passes the first opening 1042a and is received in the second receiving part 1042. The conductive board 20 is positioned on the first surface 11, each receiving protrusion 14 passes a respective positing hole 21. The conductive board 20 is electrically isolated from each conductive plate 30 by a respective receiving protrusion 14. One end of each security element 40 is soldered to the second contact portion 302 of the conductive plate 30, the other end of each security element 40 passes the second opening 1042b and is soldered to the conductive board 20. Therefore, each conductive plate 30 is electrically connected to the conductive board 20 through a respective security element 40. In other embodiment, the conductive board 20 is adhered to the first surface 11 by adhesive.

Figure 5:
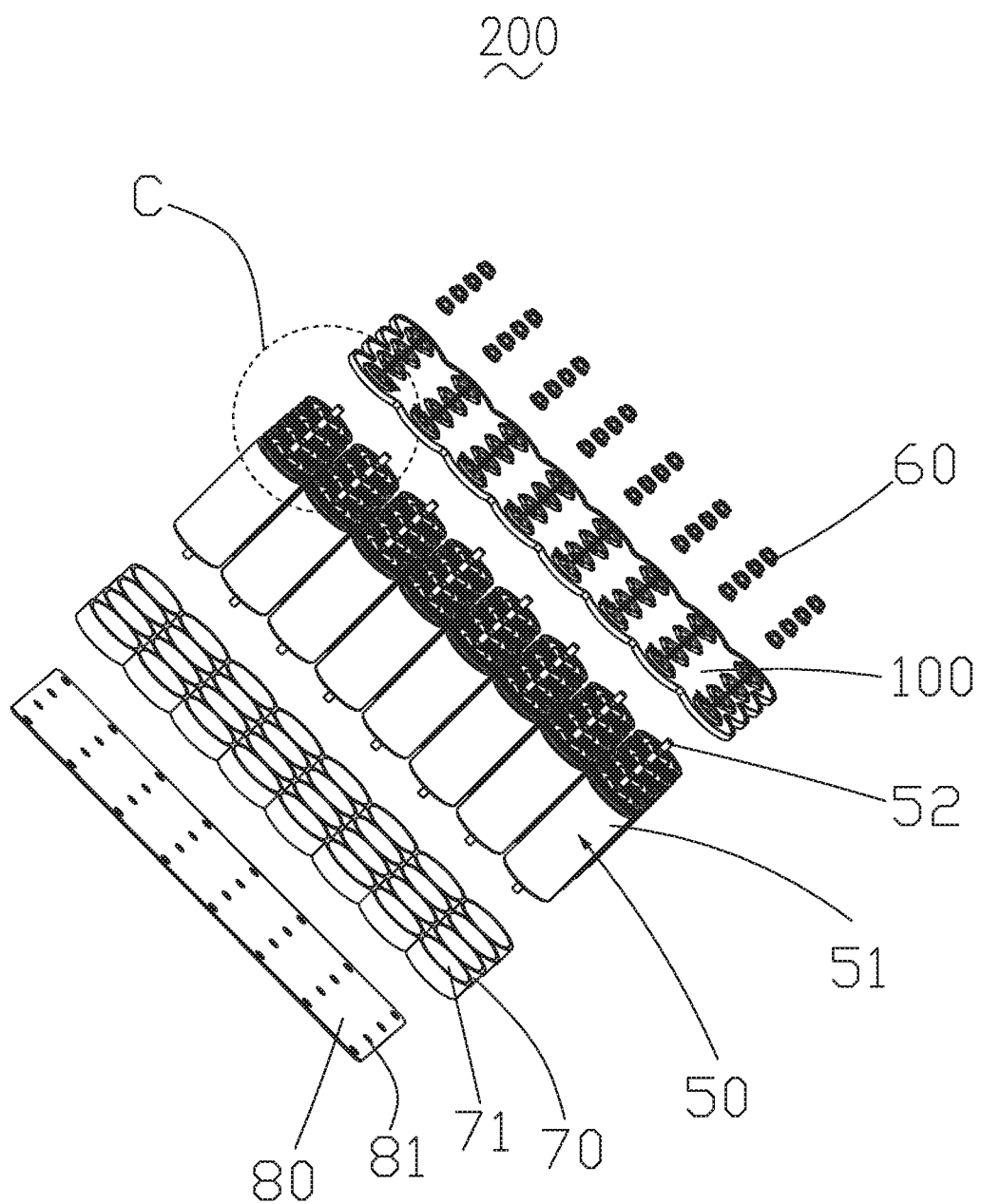
FIG. 5 is an isometric, explode schematic view of a battery module, according to a second embodiment.
Figure 6:
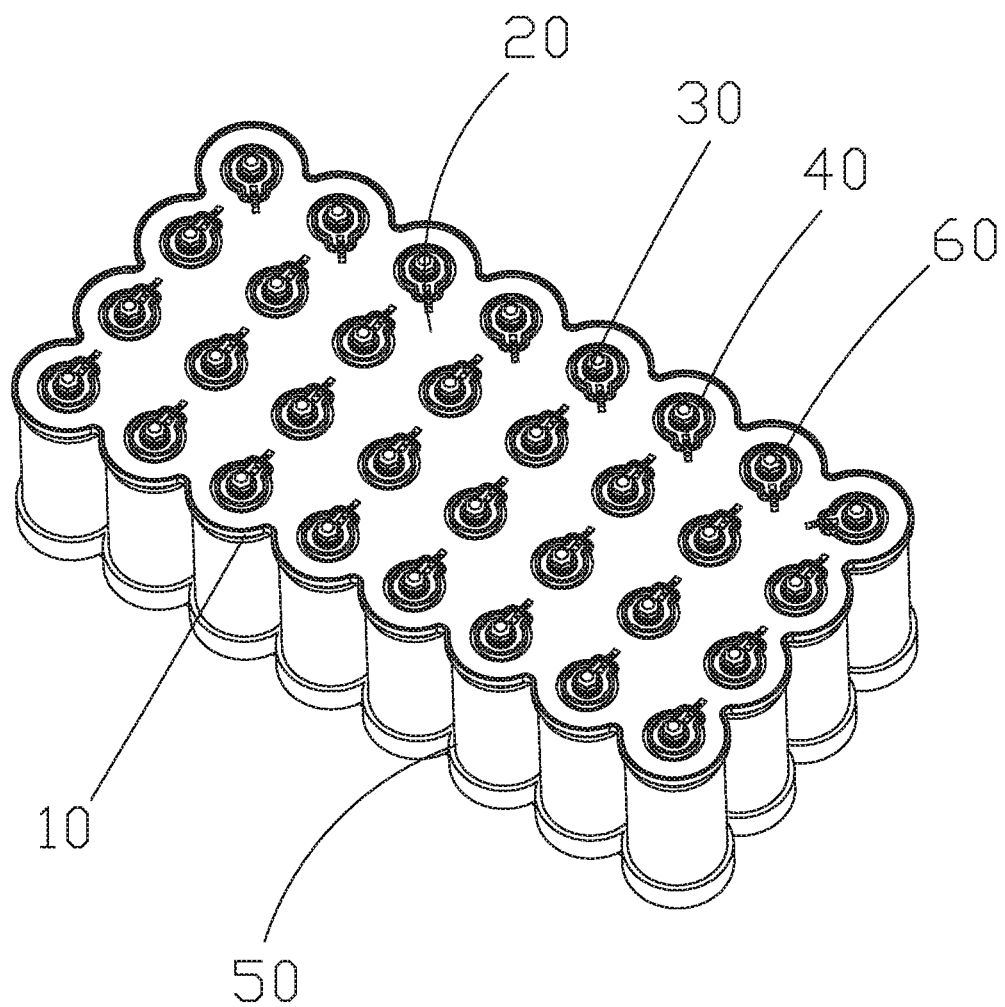
FIG. 6 is an isometric view of the battery module of FIG. 5.

Referring to FIG. 5 and FIG. 6, a battery module 200, according to a second embodiment, includes a current colleting board 100 of the first embodiment described above and shown in FIG. 1 to FIG. 4, a number of single batteries 50, a number of nuts 60, a holder 70, and an electrode board 80.

The current collecting board 100 is detailed in the first embodiment mentioned above.

The number of the single batteries 50 corresponds to the number of the receiving barrels 15. In the embodiment, each single battery 50 includes a cylindrical main portion 51 and a pair of screws 52 mounted at two opposite ends of the main portion 51. A diameter of the main portion 51 correspond to an inner diameter of the receiving barrel 15. The screws 52 are coaxial with the main portion 51. Each screw 52 includes a neck portion 521 connected to the main portion 51 and a screw portion 522 connected to the neck portion 521. The neck portion 521 and the screw portion 522 are both cylindrical and coaxial with each other. A diameter of the neck portion 521 is greater than a diameter of the screw portion 522. The screw portion 522 includes a number of external screw threads.

Each nut 60 responds to a conductive plate 30.

The holder 70 is made of dielectric material such as plastic by injection molding and defines a number of third through holes 71 each corresponds to a single battery 50. Each third through hole 71 is circular and a diameter of each third through hole 71 corresponds to the diameter of the main portion 51 of the single battery 50.

The electrode board 80 is made of metal such as copper. The electrode board 80 is substantially rectangular and defines a number of fourth through hole 81 each correspond to a third through hole 71. Each fourth through hole 81 is circular and a diameter of each fourth through hole 81 corresponds to the diameter of the screw portion 522 of the single battery 50.

Figure 7:
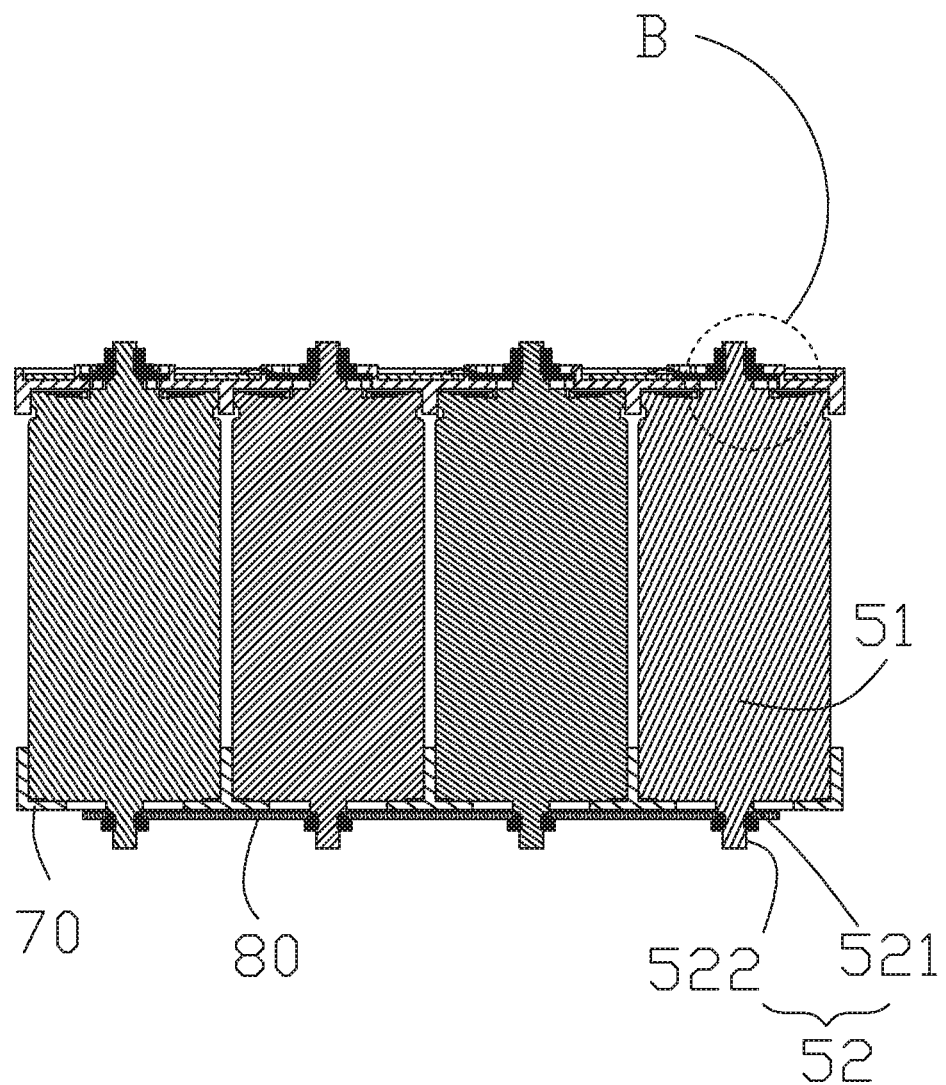
FIG. 7 is a cross-sectional view of the battery module of FIG. 6.
Figure 8:
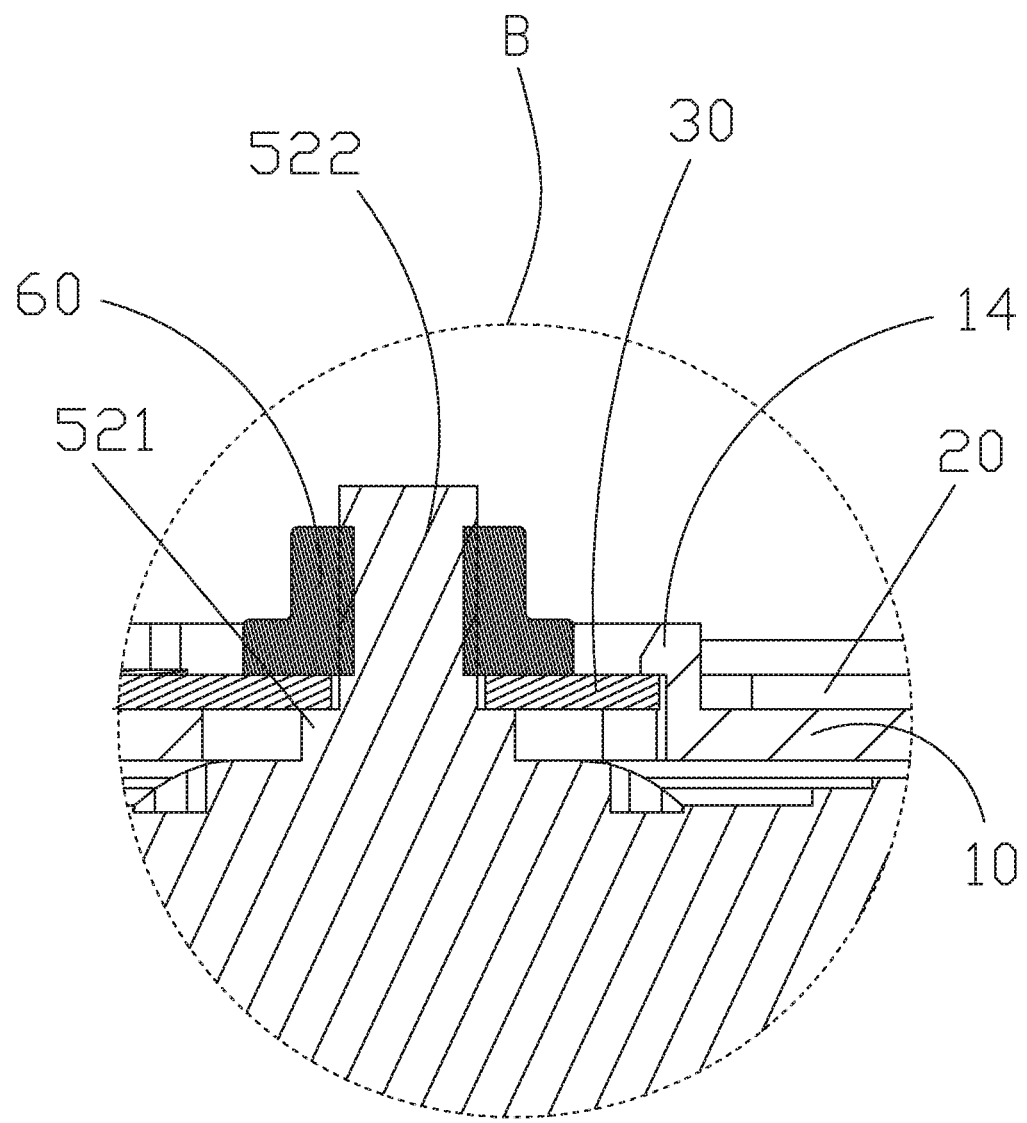
FIG. 8 partial enlarging schematic of circle B of FIG. 7.
Figure 9:
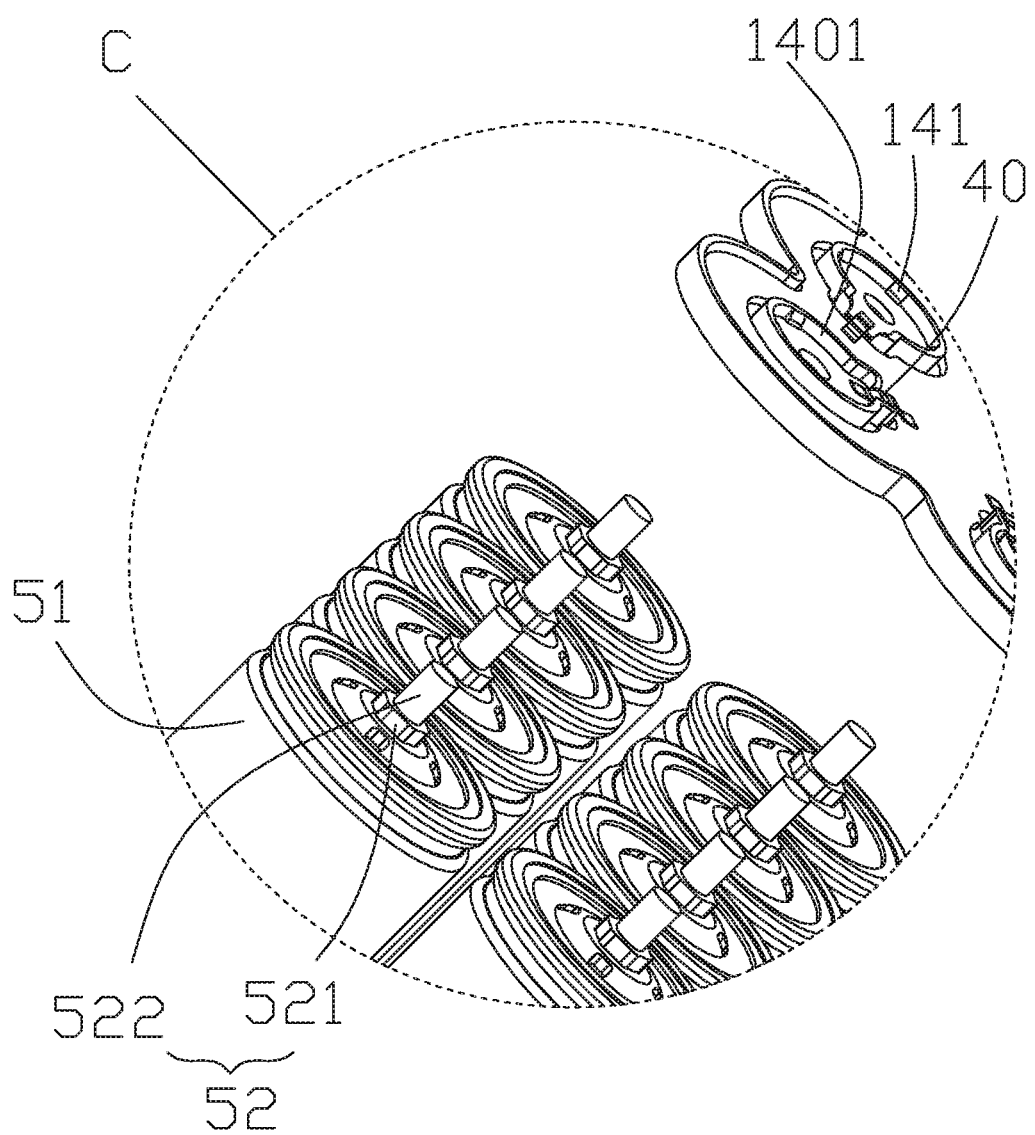
FIG. 9 partial enlarging schematic of circle C of FIG. 5.

Also referring to FIG. 7, FIG. 8, and FIG. 9, when assembling the battery module 200, the holder 70 is positioned on the electrode board 80 with each third through hole 71 surrounding a respective fourth through hole 81, one end each single battery 50 is received in a third through hole 71 with the screw portion 522 of one screw 52 of the single battery 50 passing a fourth through hole 81. Then the current collecting board 100 is positioned on the other end of each single battery 50 opposite to the electrode board 80 with the other end of each single battery 50 being received in a respective receiving barrel 15. The screw portion 522 of the other screw 52 of the single battery 50 passes the second through hole 31 of a conductive plate 30 with the conductive plate 30 attached on and electrically connected to the neck portion 521 of the other screw 52. Then each nut 60 is screwed with the screw portion 522 of the other screw 52 of the single battery 50.

The current collecting board 100 and the electrode board 80 are positioned at two ends of the single batteries 50 and electrically connect the single batteries 50 in parallel. When one of the single battery 50 is short circuit, current flows through the security element 40 connected the single battery 50 which is short circuit will rapidly increase and will fuse to protect the single battery 50 which is short circuit, therefore the battery module 200 is also protected. The security element 40 soldered to the conductive board 20 and the conductive plate 30 is easier to fuse than prior art. Therefore the current collecting board 100 and the battery module 200 are safer than the prior art. It is also decreases the weight and volume of the battery module 200 because dielectric housing are omitted compared to prior art.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A current collecting board (100), comprising:
  a base board (10), comprising:
    a first surface (11), a second surface (12) opposite to first surface (11), and a number of receiving protrusions (14) extending upwardly from the first surface (11), the base board (10) defining a number of first through holes (13) passing through the first surface (11) and the second surface (12), each receiving protrusion (14) surrounding a first through hole (13);
a conductive board (20) mounted on the base board (10);
a number of conductive plates (30), each conductive plate (30) defining a second through hole (31); and
a number of security elements (40);
wherein each receiving protrusion (14) comprises a number of leading blocks (141) and a number of clamping blocks (142) extending toward a center of the first through hole (13); each conductive plate (30) is received in a receiving protrusion (14) and clamped between the leading blocks (141) and the clamping blocks (142); one end of each security element (40) is soldered to and electrically connected to a conductive plate (30), the other end of each security element (40) is soldered to the conductive board (20).

2. The current collecting board (100) of claim 1, wherein each receiving protrusion (14) corresponds to a first through hole (13) and comprises a first receiving part (1401) and a second receiving part (1402) connecting to one side of the first receiving part (1401); the first receiving part (1401) is in a hollow cylinder shape and surrounds a respective first through hole (13); the second receiving part (1402) defines a first opening (1402a) communicating with the first receiving part (1401) and a second opening (1402b) opposite to the first opening (1402a).

3. The current collecting board (100) of claim 2, wherein the conductive plate (30) comprises a first contact portion (301) and a second contact portion (302) connecting to a side of the first contact portion (301); the first contact portion (301) is circular and a diameter of the first contact portion (301) corresponds to an inner diameter of the first receiving part (1401), the first contact portion (301) is received in the first receiving part (1401); the second contact portion (302) passes through the first opening (1402a) and is received in the second receiving part (1402).

4. The current collecting board (100) of claim 3, wherein one end of each security element (40) is soldered to and electrically connected to the first contact portion (301) of a conductive plate (30), the other end of each security element (40) passes through the second opening (1402b) and is soldered to the conductive board (20).

5. The current collecting board (100) of claim 3, wherein the second contact portion (302) has a width less than a width of the first contact portion (301).

6. The current collecting board (100) of claim 3, wherein the first contact portion (301) defines the second through hole (31).

7. The current collecting board (100) of claim 2, wherein the base board (10) further comprises a number of receiving barrels (15) extending upwardly from the second surface (12); each receiving barrel (15) surrounds a respective first through hole (13).

8. The current collecting board (100) of claim 7, wherein each receiving barrel (15) is a hollow cylinder; an inner diameter of the receiving barrel (15) is greater than an inner diameter of a first receiving part (1401) and each receiving barrel (15) is coaxial with a respective first through hole (13) and a respective first receiving part (1401).

9. The current collecting board (100) of claim 2, wherein the leading blocks (141) and the clamping blocks (142) extend from an inner surface of the first receiving part (1401) toward the center of the first through hole (13); the leading blocks (141) are uniformly distributed in a circle; the clamping blocks (142) are uniformly distributed in a circle and nearer to the first surface (11) in relation to the leading blocks (141).

10. The current collecting board (100) of claim 9, wherein the leading blocks (141) comprise a leading surface (1411) slanted to the first surface (11).

11. A battery module (200), comprising:
a current collecting board (100);
a number of single batteries (50);
a number of nuts (60);
a holder (70); and
a electrode board (80);
wherein the current collecting board (100) comprises a base board (10) comprising:
a first surface (11), a second surface (12) opposite to first surface (11), and a number of receiving protrusions (14) extending upwardly from the first surface (11), the base board (10) defining a number of first through holes (13) passing through the first surface (11) and the second surface (12), each receiving protrusion (14) surrounding a first through hole (13);
a conductive board (20) mounted on the base board (10);
a number of conductive plates (30), each conductive plate (30) defining a second through hole (31); and
a number of security elements (40);
wherein the receiving protrusion (14) comprises a number of leading blocks (141) and a number of clamping blocks (142) extending toward a center of the first through hole (13); each conductive plate (30) is received in a receiving protrusion (14) and clamped between the leading blocks (141) and the clamping blocks (142); one end of each security element (40) is soldered to and electrically connected to a conductive plate (30), the other end of each security element (40) is soldered to the conductive board (20);
wherein each single battery (50) comprises a main portion (51) and a pair of screws (52) mounted at two opposite ends of the main portion (51), each screw (52) comprises a neck portion (521) connected to the main portion (51) and a screw portion (522) connected to the neck portion (521); the holder (70) defines a number of third through holes (71) each corresponding to a single battery (50); the electrode board (80) defines a number of fourth through holes (81) each corresponding to a third through hole (71); the holder (70) is positioned on the electrode board (80) with each third through hole (71) surrounding a respective fourth through hole (81), one end of each single battery (50) is received in a third through hole (71) with the screw portion 522 of one screw (52) of the single battery (50) passing through a fourth through hole (81); the current collecting board (100) is positioned on the other end of each single battery (50) opposite to the electrode board (80), the screw portion (522) of the other screw (52) of the single battery (50) passes through the second through hole (31) of a conductive plate (30) with the conductive plate (30) attached on and electrically connected to the neck portion (521) of the other screw (52); each nut (60) is screwed with the screw portion (522) of the other screw (52) of the single battery (50).

12. The battery module (200) of claim 11, wherein the main portion (51) is cylindrical, the neck portion (521) and the screw portion (522) are both cylindrical and coaxial with each other; a diameter of the neck portion (521) is greater than a diameter of the screw portion (522).

13. The battery module (200) of claim 11, wherein each receiving protrusion (14) corresponds to a first through hole

(13) and comprises a first receiving part (1401) and a second receiving part (1402) connecting to one side of the first receiving part (1401); the first receiving part (1401) is in a hollow cylinder shape and surrounds a respective first through hole (13); the second receiving part (1402) defines a first opening (1402*a*) communicating with the first receiving part (1401) and a second opening (1402*b*) opposite to the first opening (1402*a*).

14. The battery module (200) of claim 13, wherein the conductive plate (30) comprises a first contact portion (301) and a second contact portion (302) connecting to a side of the first contact portion (301); the first contact portion (301) is circular and a diameter of the first contact portion (301) corresponds to the inner diameter of the first receiving part (1401) and received in the first receiving part (1401); the second contact portion (302) passes through the first opening (1402*a*) and is received in the second receiving part (1402); one end of each security element (40) is soldered to and electrically connected to the first contact portion (301) of a conductive plate (30), the other end of each security element (40) passes through the second opening (1402*b*) and is soldered to the conductive board (20).

15. The battery module (200) of claim 13, wherein the base board (10) further comprises a number of receiving barrels (15) extending upwardly from the second surface (12); each receiving barrel (15) surrounds a respective first through hole (13); the other end of each single battery (50) is received in a respective receiving barrel (15).

* * * * *